United States Patent

Stimson

[15] 3,706,225
[45] Dec. 19, 1972

[54] DIRECTIONAL INCLINOMETER
[72] Inventor: Paul B. Stimson, Falmouth, Mass.
[73] Assignee: The United States of America as represented by the Secretary of the Navy
[22] Filed: Oct. 22, 1970
[21] Appl. No.: 82,884

[52] U.S. Cl. ............ 73/189, 33/205.5 P, 33/206 CB
[51] Int. Cl. ............................................... G01p 5/00
[58] Field of Search ........ 73/170 A, 189; 33/205.5 P, 33/206 CB

[56] References Cited

UNITED STATES PATENTS 3,264,869  8/1966  Erdely .................................. 73/189
1,634,934  7/1927  Donaldson ...................... 33/206 CB Primary Examiner—Jerry W. Myracle
Attorney—R. S. Sciascia, L. I. Shrago and C. E. Vautrain, Jr.

[57] ABSTRACT

A device for indicating and recording data representative of direction and degree of inclination of a body or a line or of current direction and velocity by means of a tethered buoyant pendulum is provided. The device includes an outer sphere, one half of which is lined with concentric circles of various colors, and an inner hemispherical chassis which is adapted to float within the outer sphere on a thin layer of liquid between the spheres. The chassis carries photographic equipment and magnets, the former photographing arcs of the concentric circles to indicate current velocity and the latter aligning the chassis so that inclination and direction are indicated by the colors and positions of the arcs photographed.

4 Claims, 8 Drawing Figures

*INVENTOR*
Paul B. Stimson

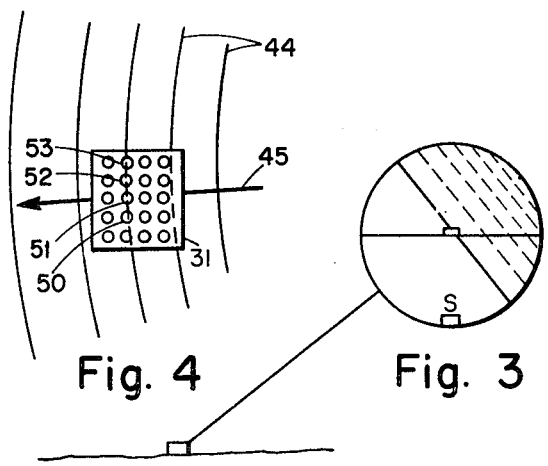
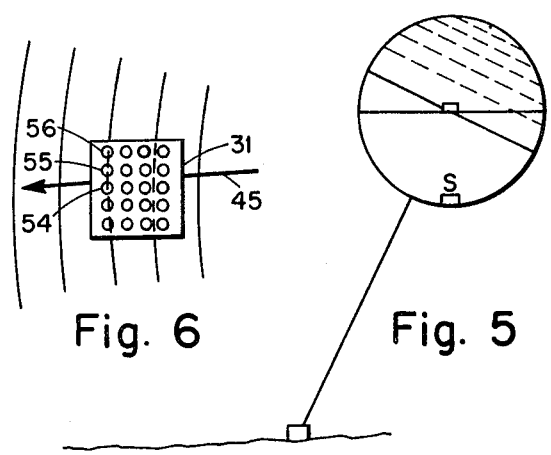
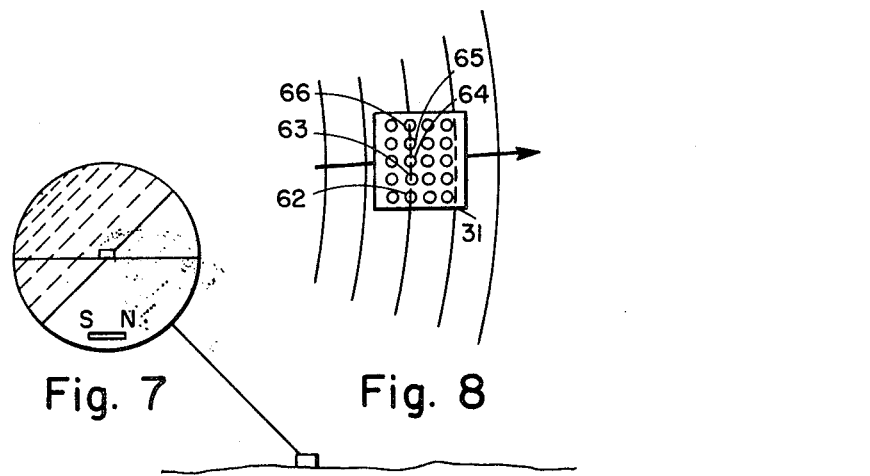
INVENTOR
Paul B. Stimson

DIRECTIONAL INCLINOMETER

The invention described herein may be manufactured and used by or for the Government of the United States of America for governmental purposes without the payment of any royalties thereon or therefor.

This invention relates to inclinometers and, more particularly, to a freely movable chassis and means associated therewith for automatically measuring and recording in situ a multiplicity of positions assumed by the body in which the chassis is mounted.

Many directional inclinometers are available for measuring in various ways parameters relating to motion, attitude and direction and, particularly in the oceanographic field, for measuring and indicating wave and current parameters. These prior devices, however, are either too complex or too costly, or both, to be used in large numbers or in circumstances where they may be disposed without appreciable loss of after use. The present invention provides a simplified directional inclinometer which avoids the disadvantages of prior devices, is capable of storing on the order of $10^5$ to $10^6$ units of information and is applicable in all situations where inclinometers are used, among other attributes.

The directional inclinometer of the present invention may be affixed to a buoy or float to detect and record pitch and roll or attached in a mooring cable to indicate inclination or used in any of many applications where direction, motion and attitude are desired to be sensed either collectively or individually. For conciseness, the description contained herein will be directed to a current meter embodiment only.

The present invention includes a hollow sphere which may be affixed to a buoy or other buoyant object or tethered to a fixed point, such as a fitting on a mooring cable or to a bottom weight, among other applications. The sphere contains a free-floating hemisphere which comprises a chassis carrying a camera and associated equipment, magnets for maintaining the chassis in line with the earth's magnetic field and ballast weights to align the camera with the zenith. The interior of the upper half of the sphere has inscribed therein a plurality of concentric lines of different color at selected spaced intervals. Lights on the chassis illuminate the zenith above the camera at any inclined position of the sphere so that the frames will show an indication of inclination by the colors and positions of the lines appearing therein. A high recording density is obtained by photographing the lines through a matrix of discrete holes, film advance between exposures being the diameter of a hole. The high density is unaffected by rotation of the outer sphere about the chassis.

Accordingly, it is an object of the present invention to provide an inclinometer that is simple in operation, inexpensive to manufacture and reliable at any selected depth.

Another object of this invention is to provide an inclinometer employing the pendulum or inverse pendulum principle which may record on the order of $10^5$ to $10^6$ measurements of current velocity and direction during a single use.

It is a further object of this invention to provide an inclinometer having a high recording density which is unaffected by rotation of its polar axis.

Other objects, advantages and novel features of the invention will become apparent from the following detailed description thereof when considered in conjunction with the accompanying drawings in which like numerals represent like parts throughout and wherein:

FIG. 3 is a schematic diagram of the embodiment of FIG. 1 at a selected attitude in a water environment;

FIG. 4 is a bottom view of the matrix at the attitude in FIG. 3;

FIG. 5 is a schematic diagram of the embodiment of FIG. 1 at a different attitude from that in FIG. 3;

FIG. 6 is a bottom view of the matrix at the attitude in FIG. 5;

FIG. 7 is a schematic diagram of the embodiment of FIG. 1 at a different attitude; and FIG. 8 is a bottom view of the matrix at the attitude in FIG. 7.

Figure 1:
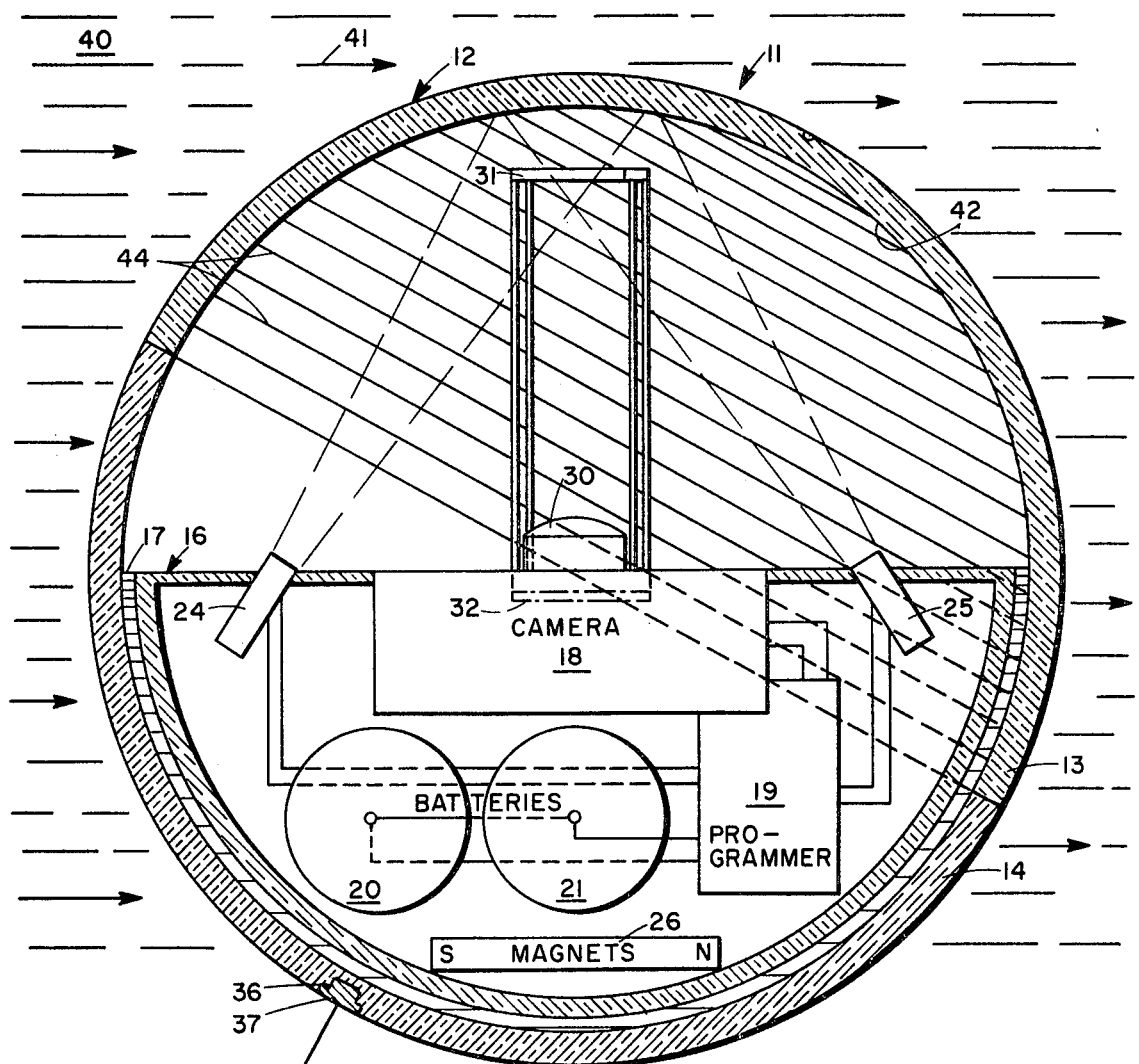
FIG. 1 is a sectional view of a preferred embodiment of the invention with operative components indicated schematically.

Referring to FIG. 1, there is shown a particular embodiment of the current meter as indicated at 11, including an outer glass sphere 12 formed of two halves 13 and 14. Within sphere 12 is positioned a chassis 16, preferably plastic in material, which floats within sphere 12 on a thin film of liquid 17. Chassis 16 carries a camera 18, a programmer 19 for controlling operation of the camera, batteries 20 and 21 and one or more light sources 24 and 25 which are directed and focused at the zenith of sphere 12 above the camera. Preferably at the base of chassis 16 are positioned magnets such as indicated at 26, the strength of the magnets being determined by the torque desired in maintaining chassis 16 aligned with the earth's magnetic field. Camera 18, programmer 19 and light sources 24 and 25 are connected by conventional means to the batteries so that the device may operate automatically. Programmer 19 contains a timer and related electrical and mechanical components, not shown, for operating camera 18 and lights 24 and 25 at selected intervals of time. Camera 18 is centrally positioned within hemispherical chassis 16 and has its lens 30 centrally disposed on the chassis. A preferably square matrix 31 preferably is positioned precisely in a focal plane of lens 30 so that the view of the camera is always directed through the matrix towards the zenith of sphere 12 which is determined by the position of chassis 16 therein.

Matrix 31 may be positioned as close as possible to the inner surface of sphere 12 as shown, and miniature lights, not shown, may be attached thereto to illuminate the adjacent area of the sphere. The matrix probably would be most effective if it could be placed directly on the surface of the camera film as indicated at 32. Sphere 12 has secured to it at its outer surface a tether 35 which may be attached at one end to the sphere by a bolt 35 and a locking nut 37. The tether is secured at its other end to a mooring or other device by conventional means, not shown.

In FIG. 1, sphere 12 is shown positioned in a body of water 40 in which the direction of current is indicated by arrows 41. Sphere 12 has a pole marked opposite the point of attachment of tether 35, as indicated at 42, so that when tethered in current 41 the drag on the sphere will cause the sphere to be displaced at the angle tether 35 makes with the normal and also will cause chassis 16 to assume a position the zenith of which is at the same angle from pole 42. Sphere 12 has drawn on its inner surface a plurality of lines 44 which are each of a different color or of an arrangement of different colors. Lines 44 could also be formed of characters such as dots, circles, arrowheads, squares, dashes, etc., in addition to or exclusive of the use of colors. Each line represents a current velocity as determined by the drag coefficient of the attitude assumed by the sphere. At angle "A", shown in FIG. 1, camera 18 will photograph lines 44 which appear within a selected distance of the zenith, this selected distance being illuminated by light sources 24 and 25 and indicated at 46.

Figure 2:
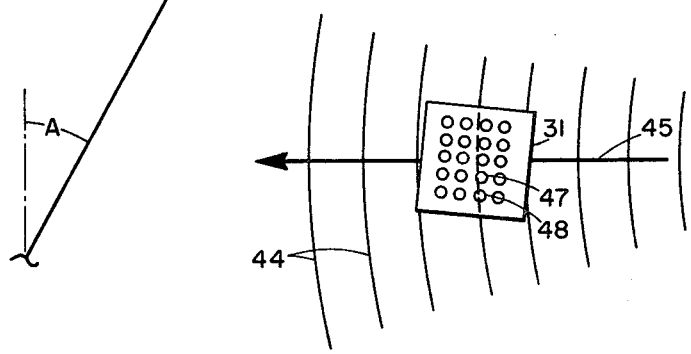
FIG. 2 is a bottom view of the matrix of FIG. 1.

FIG. 2 is a plan view of matrix 31 at the attitude shown in FIG. 1 and includes portions of lines 44 which appear at the zenith of the sphere and which are seen through small openings in the matrix as indicated at 47 and 48. Matrix 31 is shown skewed to the axis of film advance which is indicated at 45.

FIGS. 3, 5, 7 and 9 show sphere 13 is various attitudes with respect to sphere 12. FIGS. 4, 6, 8 and 10 are bottom views of matrix 31 at the attitudes assumed by chassis 16 in FIGS. 3, 5, 7 and 9, respectively.

In a preferred embodiment of the invention, chassis 16 is an opaque plastic hemisphere having an outside diameter only slightly less than the inside diameter of a 9 ¼-inch glass sphere 12. Plastic chassis 16 floats on the thin liquid film 17 and is ballasted in a manner, not shown, to maintain its equator in a horizontal attitude. Sufficient permanent magnets 26 are installed to maintain chassis 16 oriented with respect to magnetic north regardless of the attitude of outer sphere 12. The spacing of circles 44 is selected with respect to the field of view of camera 18 so that a segment of at least one circle or the polar dot is always in view. The color, position and orientation of a line or lines across the field of view thus uniquely define the attitude of sphere 12 except for rotation about its polar axis, which rotation is immaterial and does not affect the sensitivity of the system.

The present invention provides the sensitivity required above by being capable of recording exposures at a spacing apart equal to the diameter of a matrix opening such as the holes shown. The skewing of the longitudinal axis of matrix 31 with respect to the direction of film advance is essential to this high density of recording. When the developed film is projected through a similar matrix, only one exposure at a time will be projected. Film advance along axis 45 could be related to the sprocket holes in the film in lieu of to frame spacing in a manner not shown.

In FIG. 3, sphere 12 is in a stronger current and in a different magnetic field than shown in FIG. 1, the current direction being essentially eastward. Lines 44 appear through matrix openings 50 - 53, inclusive. In FIG. 5, the magnetic field is the same as in FIG. 3, but the current is less so that polar circles nearer the pole of sphere 12 are photographed, permitting lines 44 to appear through matrix openings 54 - 56, inclusive, as shown in FIG. 6. FIG. 8 shows the matrix view of sphere 12 in FIG. 7, indicating a southward current and also that lines 44 appear in openings indicated at 62 through 66. In operation, a particular angle of tether 35 and a particular magnetic field such as those indicated in FIGS. 2, 3, 5 and 7 will cause corresponding sectors 46 to appear at the zenith of sphere 12. In any set of conditions of tether angle and magnetic field, film advance is preferably a distance of one hole diameter per exposure.

The present invention thus provides for a very great quantity of information on current strength and direction to be recorded in a compact and inexpensive device. The device is insensitive to rotation of sphere 12 about the tether as an axis, which feature makes possible the high recording density and also enhances reading of the records by machines. The use of matrix 31 also facilitates the very short film advance between exposures which, among other things, sorts out the multiplicity of data that ordinarily would appear and would confuse and make more difficult data reductions.

By means of the present invention, a large number of relatively inexpensive current meters may be deployed in several contiguous areas via a single vessel and mission. The meters may be placed in any depth and may be recovered either by capture or by timed release via soluble discs or other conventional means for effecting remote release of submerged objects. Minor inaccuracies occurring through changes in the center of gravity of chassis 16 may be compensated for by introducing an equal and opposite motion or may be allowed for in the data reduction process.

Obviously many modifications and variations of the present invention are possible in the light of the above teachings. For example, the camera lens may be dispensed with and a bundle of optical fibers substituted which would extend substantially to the inner surface of sphere 12 to conduct information to the camera film. Also, the outer glass sphere may be made opaque for use in the euphotic zone.

What is claimed is:

1. A current meter adapted to detect and record a multiplicity of current velocity and direction indications comprising:

a hollow sphere having means for exterior attachment to a tether at one pole and a plurality of individually distinguishable concentric lines on its interior surface about the opposite pole, said lines extending at least to the equator between said poles;

a tether attached at one end to said sphere and at the other end to a mooring or a bottom weight;

a small amount of liquid in said sphere and a hollow chassis means substantially hemispherical in shape disposed in said sphere and adapted to float on a thin film of said liquid;

said chassis having means mounted therein for aligning it with the environmental magnetic field;

a camera and lighting means for use therewith mounted on the planar surface of said chassis, said camera and said lighting means positioned on said chassis and directed so that a limited area of said sphere at the zenith of said chassis will be illuminated and photographed; and control and power means for operating said camera and energizing said lighting means, whereby drag of said sphere in a current causes inclination of said tether and said sphere, said chassis assuming a horizontal attitude and said camera photographing portions of the concentric lines indicating current velocity.

2. The device as defined in claim 1 wherein said concentric lines are distinguishable from one another by color alone.

3. The device as defined in claim 2 and further including a matrix positioned between the camera and the zenith for limiting the portions of said concentric lines which are viewed by said camera,
  said matrix being substantially square,
  said transverse axis skewed to the direction of film travel to facilitate the recording of a density of information on the order of $10^5$ to $10^6$ current readings in one sampling.

4. The device as defined in claim 3 wherein the lens of the camera and the matrix are replaced by a plurality of optical fibers,
  said fibers having their outer ends disposed near the inner surface of said hollow sphere to receive a more distinct image to conduct to said camera.

* * * * *